United States Patent [19]

Horii et al.

[11] Patent Number: 4,716,775
[45] Date of Patent: Jan. 5, 1988

[54] TRANSMISSION HAVING CASSETTE TYPE SUPPLEMENTARY CHANGE SPEED APPARATUS

[75] Inventors: Yasuyuki Horii; Takao Nishikawa, both of Sakai; Isamu Yamanishi, Takaishi; Tomeo Umemoto, Osaka, all of Japan

[73] Assignee: Kubota, Ltd., Osaka, Japan

[21] Appl. No.: 852,764

[22] Filed: Apr. 16, 1986

[30] Foreign Application Priority Data

Aug. 20, 1985 [JP] Japan .......................... 60-127384[U]
Nov. 20, 1985 [JP] Japan ................................ 60-260445
Nov. 20, 1985 [JP] Japan ................................ 60-260446

[51] Int. Cl.$^4$ ............................................. F16H 37/00
[52] U.S. Cl. ..................................... 74/15.86; 74/745; 74/15.4
[58] Field of Search ...................... 74/15.4, 15.86, 745

[56] References Cited

U.S. PATENT DOCUMENTS

| 2,094,421 | 9/1937 | Wagner | 74/15.86 |
| 2,453,685 | 11/1948 | Haefelt | 74/15.4 |
| 2,743,615 | 5/1956 | Keese | 74/15.86 X |
| 2,975,656 | 3/1961 | Haverlender | 74/15.86 X |
| 3,232,125 | 2/1966 | Lee et al. | 74/15.86 |
| 4,273,007 | 6/1981 | Sato et al. | 74/745 |
| 4,304,141 | 12/1981 | Tone et al. | 74/15.2 |
| 4,326,597 | 4/1982 | Murayama et al. | 74/745 X |
| 4,462,273 | 7/1984 | Yoshii et al. | 74/15.86 X |
| 4,610,174 | 9/1986 | Takagi et al. | 74/15.4 X |

FOREIGN PATENT DOCUMENTS 0174745 10/1983 Japan ................................ 74/745

Primary Examiner—Leslie Braun
Assistant Examiner—Dirk Wright
Attorney, Agent, or Firm—Cushman, Darby & Cushman

[57] ABSTRACT

A transmission comprising a main change speed mechanism, an auxiliary change speed mechanism, a rear differential mechanism and a cassette type supplementary change speed mechanism. The supplementary change speed mechanism acts on the transmission through an opening defined in a transmission case housing the transmission. The supplementary change speed mechanism is housed in and supported by a supplementary change speed case which is attached to the transmission case. Transmissions of various specifications may be provided by making various types of supplementary change speed mechanism. The supplementary change speed mechanism is applicable to a propelling transmission line and/or a power takeoff transmission line.

4 Claims, 13 Drawing Figures

TRANSMISSION HAVING CASSETTE TYPE SUPPLEMENTARY CHANGE SPEED APPARATUS

BACKGROUND OF THE INVENTION (1) Field of the Invention

The present invention relates to a transmission particularly for an agricultural tractor, which transmission includes change speed mechanisms for transmitting engine output in various speeds to ground-engaging wheels and a working implement.

(2) Description of the Prior Art

Known tractor transmissions in most cases include a main change speed mechanism, an auxiliary change speed mechanism and a rear differential mechanism housed in a single transmission case. Therefore, when modifying the specifications of the change speed mechanisms, for example increasing the number of speeds provided thereby, it is necessary to change the design of the transmission case as well as the construction of the change speed mechanisms. This means that the specifications of the change speed mechanisms cannot be changed by employing a simple additional unit for models already manufactured and sold. One prior art example is known from U.S. Pat. No. 4,273,007 in which the transmission case comprises a front case housing a main change speed mechanism and a rear case housing a rear differential mechanism, and an auxiliary case housing an auxiliary change speed mechanism is attached to an opening defined on a top wall of the front case. U.S. Pat. No. 4,326,597 discloses another prior art example in which an auxiliary case housing an auxiliary change speed mechanism is interposed between a front case and a rear differential mechanism. These transmissions meet the requirement for modification to the specifications in that the entire auxiliary change speed mechanism may be changed as necessary. They may be of advantage to the maker for the purpose of modifying models in the manufacturing process, but the changing operation is too troublesome for the user to carry out and is hardly impracticable for him. It is an excessive burden on the maker to provide the user with various types of auxiliary change speed mechanism as options in order to meet the diverse needs of the user since it would oblige the maker to manufacture various types of large parts in small quantities.

SUMMARY OF THE INVENTION

The object of the invention is to provide a transmission easy to modify with respect to its change speed specifications, which fully satisfies the needs of the user and is of advantage to the user as well.

In order to achieve this object, a transmission for an agricultural tractor according to the present invention comprises a main change speed mechanism; an auxiliary change speed mechanism; a rear differential mechanism; a transmission case including a front case housing the main change speed mechanism, an intermediate case housing the auxiliary change speed mechanism, and a rear case housing the rear differential mechanism; a PTO transmission mechanism having PTO shaft means extending through the main and auxiliary change speed mechanisms and the rear differential mechanism, the PTO shaft means including a first PTO shaft supported by the front case and a second PTO shaft supported by the rear case; and a cassette type supplementary change speed means including a supplementary change speed case removably attached to an opening defined in the transmission case and acting as a cover for the opening, and a supplementary change speed mechanism supported only by the supplementary change speed case.

The transmission may be composed of three units by dividing the transmission case into three parts housing the change speed and differential mechanisms, respectively, as described above. It is therefore possible to manufacture a group of transmissions that meets a significant part of user's needs, by making available various types of each of the main change speed mechanism housed in the front case, the auxiliary change speed mechanism housed in the intermediate case and the rear differential mechanism housed in the rear case and suitably combining them in the manufacturing process. Furthermore, the specifications of the propelling drive line and the PTO drive line may readily be modified by attaching the cassette type supplementary change speed means, namely the type having its entire change speed mechanism encased, to the opening defined in the transmission. The userhs needs may be satisfied to a greater extent if various types of such supplementary change speed means are offered to the user as options.

BRIEF DESCRIPTION OF THE DRAWINGS

FIG. 3c is a side view of a rear portion of the transmission.

DESCRIPTION OF THE PREFERRED EMBODIMENTS

An agricultural tractor embodying the invention will be described hereinafter with reference to the drawings.

Figure 1:
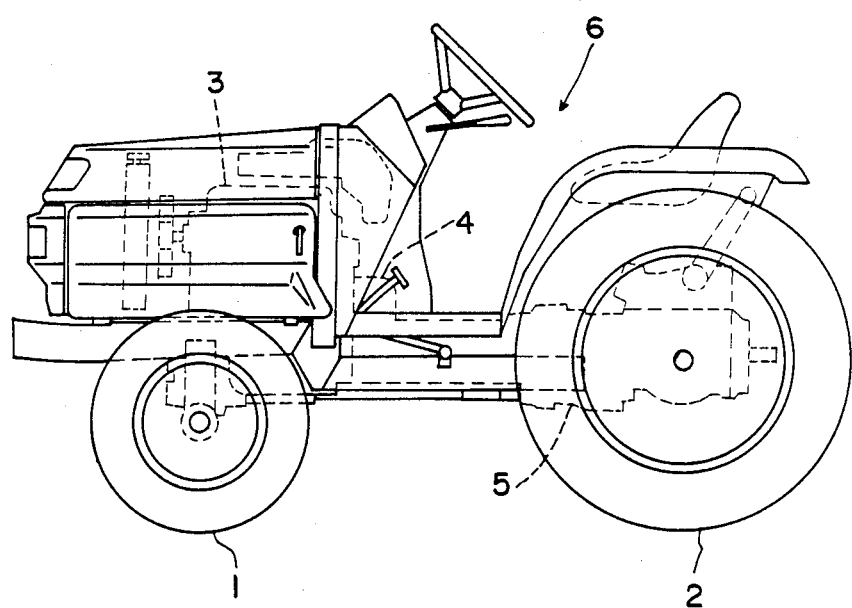
FIG. 1 is a side elevation of an agricultural tractor equipped with a transmission embodying the present invention.

As shown in FIG. 1, the tractor comprises front wheels 1 and rear wheels 2 supporting a chassis on which an engine 3, a main clutch housing 4 and a transmission case 5 are mounted and directly connected to one another, with a driver's section 6 provided at an intermediate portion of the tractor.

Figure 2:
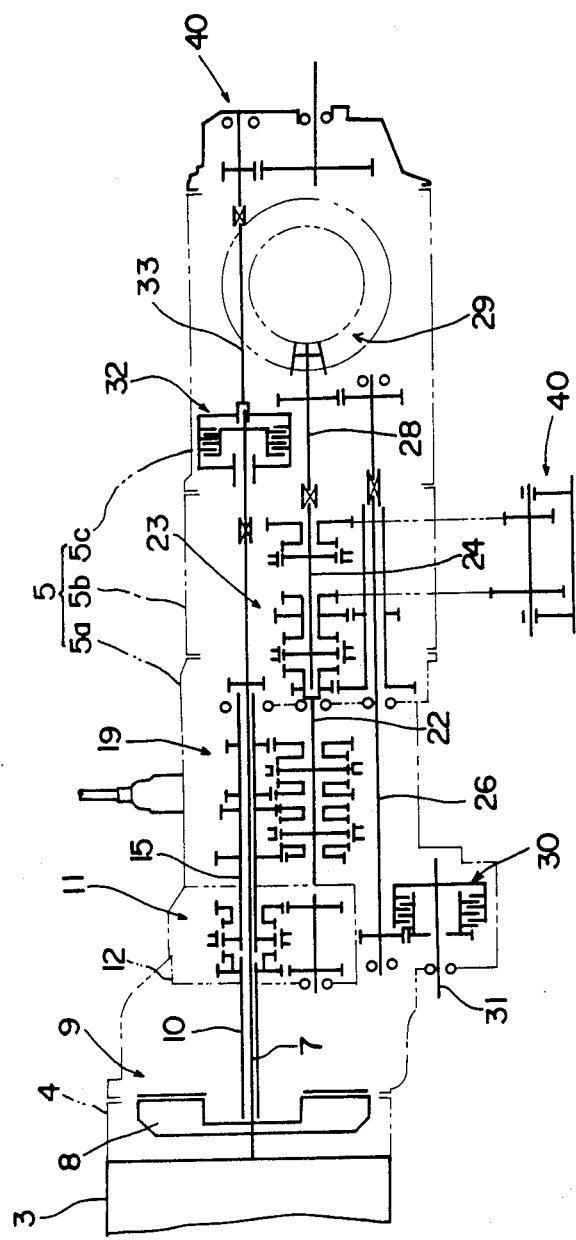
FIG. 2 is a schematic side view of the entire transmission.

Referring to FIG. 2 showing a power transmission system extending from the engine 3, the transmission case 5 connected to the main clutch housing 4 comprises a front case 5a housing a backward and forward drive switching mechanism 11 and a main change speed mechanism 19 to be described later, an intermediate case 5b housing an auxiliary change speed mechanism 23, and a rear case 5c housing a rear differential mechanism 29.

Figure 3A:
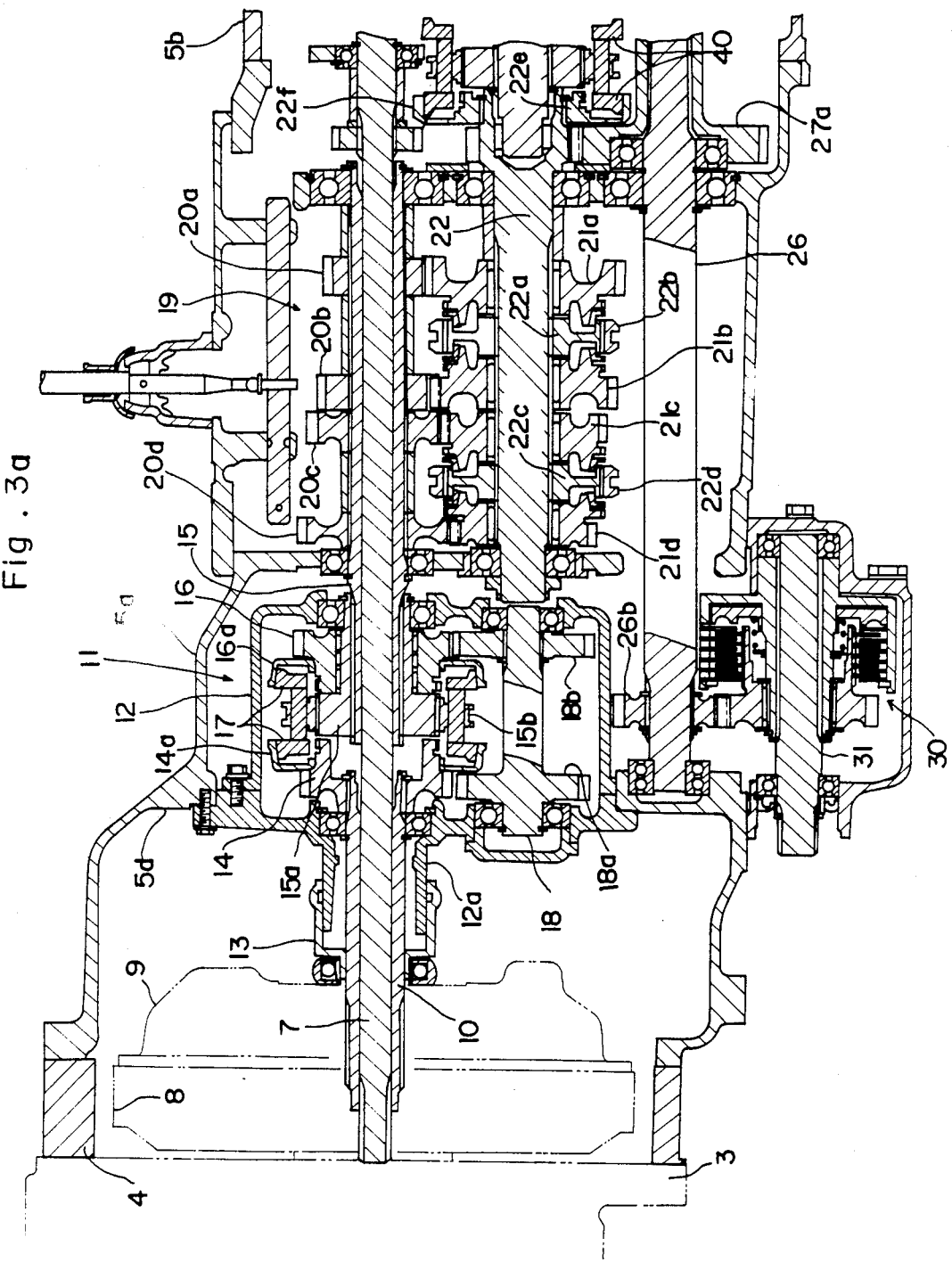
FIG. 3a is a side view of a front portion of the transmission.

Referring to FIG. 3a, a first PTO shaft 7 and a flywheel 8 are directly connected to an output shaft (not shown) of the engine 3 inside the main clutch housing 4. An input sleeve shaft which is an input shaft 10 of the backward and forward drive switching mechanism 11 is freely rotatably fitted on the first PTO shaft 7 and is connected to the flywheel 8 through a main clutch 9. The backward and forward drive switching mechanism 11 is contained in a change speed case 12 mounted in a region of the front case 5a downstream of the main clutch 9. The change speed case 12 defines a tubular release support 12a at a front end thereof. The change speed case 12 is fixed by means of this release support 12a to a release support mounting base 5d defined on an inside wall of the transmission case 5. A tubular release 13 is fitted on the release support 12a to be axially movable by an operation effected outside the case for engaging and disengaging the main clutch 9.

The backward and forward drive switching mechanism 11 contained in the change speed case 12 will particularly be described next. This backward and forward drive switching mechanism 11 is the synchromesh type, and has the input sleeve shaft 10 as its input shaft and an output sleeve shaft 15 coaxial with the input sleeve shaft 10 and freely rotatably fitted on the first PTO shaft 7 as its output shaft. The backward and forward drive switching mechanism 11 comprises a drive gear 14 fixed to the input sleeve shaft 10 and carrying a synchronizing cone 14a, a base 15a fixed to the output sleeve shaft 15, a shift member 15b splined to the base 15a to be rotatable in unison and slidable axially thereof, and a gear 16 freely rotatably mounted on the base 15a and carrying a synchronizing cone 16a.

A synchronizer ring 17 is disposed between the shift member 15b and the synchronizing cones 14a and 16a. When the shift member 15b is shifted toward the drive gear 14, the frictional action of the synchronizer ring 17 and shift member 15b imparted to the synchronizing cone 14a causes the shift member 15b and the drive gear 14 to engage each other as their rotations are synchronized. This causes the input sleeve shaft 10 and the output sleeve shaft 15 to be directly coupled to each other to transmit the power in forward rotation whereby the tractor travels forward. Conversely, when the shift member 15b is shifted into engagement with the gear 16 as their rotations are synchronized by the synchronizer ring 17, the power is transmitted through a reversing gear (not shown) in mesh with the drive gear 14, a transmission shaft 18, a gear 18b, the gear 16 and the shift member 15b to the output sleeve shaft 15 in reversed rotation whereby the tractor travels backward.

The main change speed mechanism 19 disposed downstream of the backward and forward drive switching mechanism 11 with respect to the direction of power transmission will be described next. The main change speed mechanism 19 comprises a first transmission shaft 22 disposed parallel to the output sleeve shaft 15, a first to a fourth transmission gears 20a-20d fixed to the output sleeve shaft 15, a first to a fourth driven gears 21a-21d freely rotatably mounted on the first transmission shaft 22 and in mesh with the first to fourth transmission gears 21a-21d, respectively, a base 22a fixed to the first transmission shaft 22 between the first driven gear 21a and the second driven gear 21b, a base 22c fixed to the first transmission shaft 22 between the third driven gear 21c and the fourth driven gear 21d, and shift members 22b and 22d splined to the bases 22a and 22c to be rotatable in unison therewith and axially slidable relative thereto, respectively.

The power is transmitted from the output sleeve shaft 15 to the first transmission shaft 22 in a first speed when the shift member 22b engages the first driven gear 21a and in a second speed when the shift member 22b engages the second driven gear 21b. The power is transmitted from the output sleeve shaft 15 to the first transmission shaft 22 in a third speed when the shift member 22d engages the third driven gear 21c and in a fourth speed when the shift member 22d engages the fourth driven gear 21d.

Figure 3B:
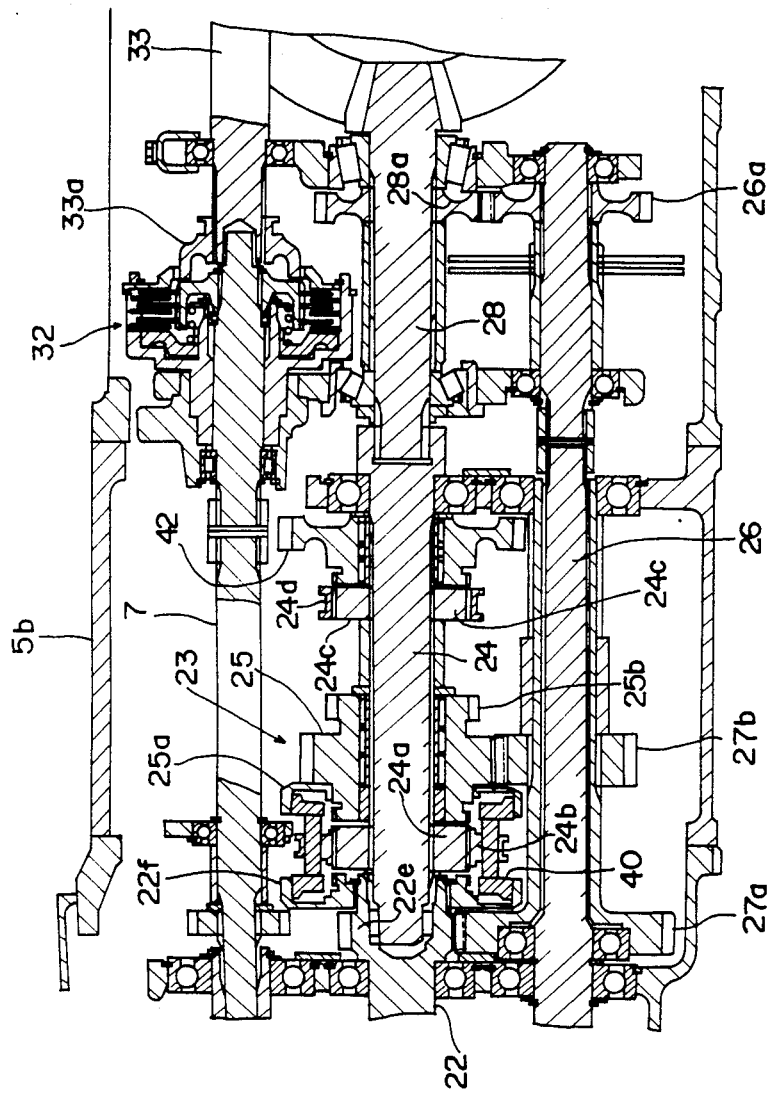
FIG. 3b is a side view of an intermediate portion of the transmission.

As shown in FIG. 3b, the intermediate case 5b connected to the front case 5a houses the auxiliary change speed mechanism 23 of the synchromesh type which is adapted to provide two, high and low speeds. This intermediate case 5b defines an opening A in a lateral region thereof for attaching a cassette type auxiliary change speed means to be described later for varying the number of speeds. FIG. 3b shows a state where the opening A is closed by a cover and the auxiliary change speed means is not attached.

The auxiliary change speed mechanism 23 comprises a second transmission shaft 24 disposed downstream of and coaxially with the first transmission shaft 22 to be rotatable relative thereto, a second auxiliary change speed gear 25 freely rotatably mounted on the second transmission shaft 24 and carrying a synchronizing cone 25a, a first auxiliary change speed gear 22e mounted at an end of the first transmission shaft 22 and carrying a synchronizing cone 22f, an auxiliary change speed base 24a fixed to the second transmission shaft 24, a shift member 24b splined to the base 24a to be rotatable in unison therewith and axially slidable relative thereto, and a third auxiliary change speed gear 27a and a fourth auxiliary change speed gear 27b mounted on a front wheel output shaft 26 to be freely rotatable relative thereto and rotatable in unison with each other.

A synchronizer ring 40 is disposed between the shift member 24b and the synchronizing cones 22f and 25a. When the shift member 24b is shifted toward the gear 22e on the first transmission shaft 22, the frictional action of the synchronizer ring 40 and shift member 24b imparted to the synchronizing cone 22f causes the shift member 24b and the first auxiliary change speed gear 22e to engage each other as their rotations are synchronized. This causes the first transmission shaft 22 and the second transmission shaft 24 to be directly coupled to each other to transmit the power in high speed rotation. Conversely, when the shift member 24b is shifted into engagement with the second auxiliary change speed gear 25 as their rotations are synchronized by the synchronizer ring 40, the power is transmitted from the first transmission shaft 22 through the third and fourth auxiliary change speed gears 27a, 27b and the second auxiliary change speed gear 25 to the second transmission shaft 24 to provide the low speed condition.

As described hereinbefore, the auxiliary change speed mechanism 23 may be combined with a cassette type supplementary change speed means attached to the opening A of the transmission case in order to vary the number of speeds to be provided thereby. FIGS. 4 through 8 show how the supplementary change speed means 40 is attached.

The cassette type supplementary change speed means 40 basically comprises an supplementary change speed case 40b removably attached to the opening A of the transmission case and a supplementary change speed mechanism 40a supported only by the supplementary change speed case 40b.

Figure 4:
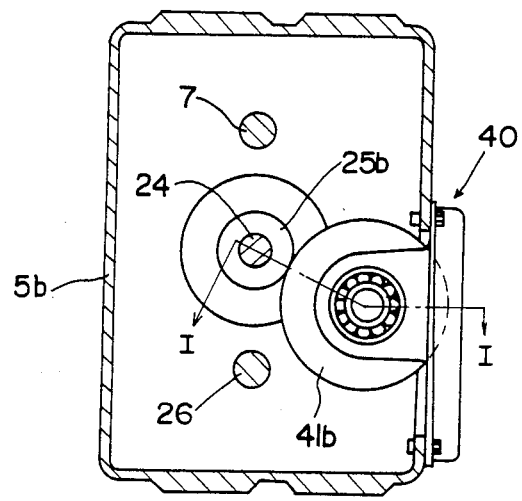
FIG. 4 is a front view of a first example of supplementary change speed means as attached to an opening of an intermediate case.
Figure 5:
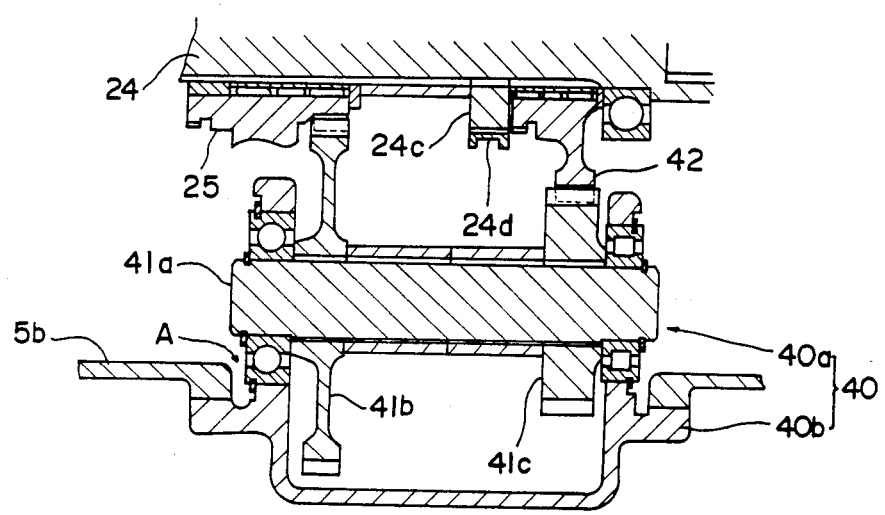
FIG. 5 is a section taken on line V—V of FIG. 4.

FIGS. 4 and 5 show one example of supplementary change speed means attached to the opening A defined in a lateral region of the intermediate case 5b and combined with the auxiliary change speed mechanism 23.

The supplementary change speed mechanism 40a includes a first supplementary change speed transmission shaft 41a, a first supplementary change speed gear 41b fixed to one end the shaft 41a, and a second supplementary change speed gear 41c fixed to the other end thereof. The supplementary change speed case 40b supports the first supplementary change speed transmission shaft 41a and also acts as cover for the opening A.

In order to allow the aforesaid combination, the second transmission shaft 24 carries an input gear 42 freely rotatably mounted thereon and an input base 24c fixed to the shaft 24. An input shift member 24d is splined to the input base 24c to be rotatable together and axially slidable relative thereto. The second auxiliary change speed gear 25 defines teeth to be engageable with the input shift member 24d. The second auxiliary change speed gear 25 also defines a further gear 25b integral therewith.

The supplementary change speed mechanism 40a is mounted by engaging the first supplementary change speed gear 41b with the further gear 25b of the second auxiliary change speed gear 25 mounted on the second transmission shaft 24 and engaging the second supplementary change speed gear 41c with the input gear 42. Then the auxiliary change speed mechanism 23 in combination with the supplementary change speed means is adapted to provide three speeds, i.e. high, low and ultra-low speeds.

The high and low speeds are provided by shifting the shift member 24b into engagement with the gears 22e and 25 as already described. The ultra-low speed is provided by shifting the input shift member 24d disposed downstream of the gear 25 with respect to the direction of power transmission. When the input shift member 24d is brought into engagement with the teeth provided for this purpose on the input gear 42, the power is transmitted from the first transmission shaft 22 through the third and fourth auxiliary change speed gears 27a and 27b, the further gear 25b, the supplementary change speed mechanism 41, the input gear 42 to the second transmission shaft 24, thereby providing the ultra-slow speed.

Figure 6:
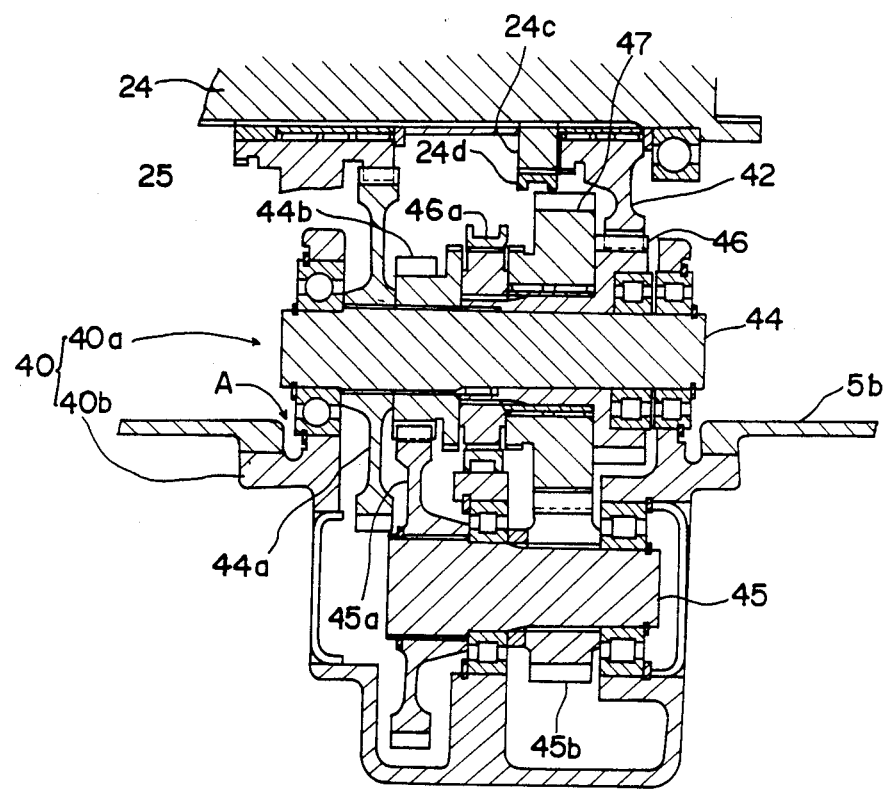
FIG. 6 is a side view of a second example of supplementary change speed means as attached the opening of the intermediate case.

The described supplementary change speed means may be replaced by a second example of supplementary change speed means 40 including a supplementary change speed mechanism 40a and attached to the opening A of the intermediate case 5b as shown in FIG. 6. Then the combination of the auxiliary change speed mechanism 23 and the supplementary change speed mechanism 40a is adapted to provide four speeds, i.e. high, low, ultra-low and creep speeds. As seen, the supplementary change speed mechanism 40a comprises a first supplementary change speed transmission shaft 44, a first and a third supplementary change speed gears 44a and 44b fixed to the shaft 44, a second supplementary change speed gear 46 freely rotatably mounted on the shaft 44, a supplementary change speed shift member 46a mounted at an end of a boss portion of the second supplementary change speed gear 46, a sixth supplementary change speed gear 47 freely rotatably mounted on the boss portion of the gear 46, a second supplementary change speed transmission shaft 45, and a fourth and a fifth supplementary change speed gears 45a and 45b fixed to the shaft 45 and in mesh with the third and sixth supplementary change speed gears 44b and 47. The supplementary change speed means 40 having the above change speed mechanism 40a is attached to the intermediate case 5b by engaging the first gear 44a with the further gear 25b of the second auxiliary change speed gear 25 mounted on the second transmission shaft 24 and engaging the second gear 46 with the input gear 42 mounted on the second transmission shaft 24.

The high and low speeds are provided by shifting the shift member 24b of the auxiliary change speed mechanism 23 as already described. The ultra-slow speed and creep speed are provided by the following operations.

When the input shift member 24d on the input base 24c fixed to the second transmission shaft 24 is brought into engagement with the input gear 42 and the the shift member 46a of the supplementary change speed means is brought into engagement with the aforesaid teeth defined on the third gear 44b, the power is transmitted from the first transmission shaft 22 through the third and fourth auxiliary change speed gears 27a and 27b, the second auxiliary change speed gear 25, the supplementary change speed mechanism 40a and the input gear 42 on the second transmission shaft 24 to the second transmission shaft 24, thereby providing the ultra-slow speed. When, with the input shift member 24d on the second transmission shaft 24 retained in mesh with the input gear 42, the shift member 46a of the supplementary change speed mechanism 40a is brought into engagement with the sixth gear 47, the power transmitted up to the third gear 44b as described above is proceed through the fourth gear 45a, the second transmission shaft 45, the fifth gear 45b and the sixth gear 47 to the second gear 46, thereby providing the creep speed.

Figure 7:
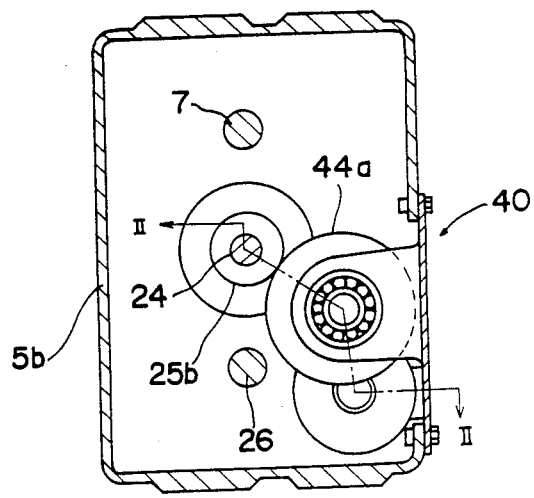
FIG. 7 is a front view of a third example of supplementary change speed means as attached to the opening of the intermediate case.
Figure 8:
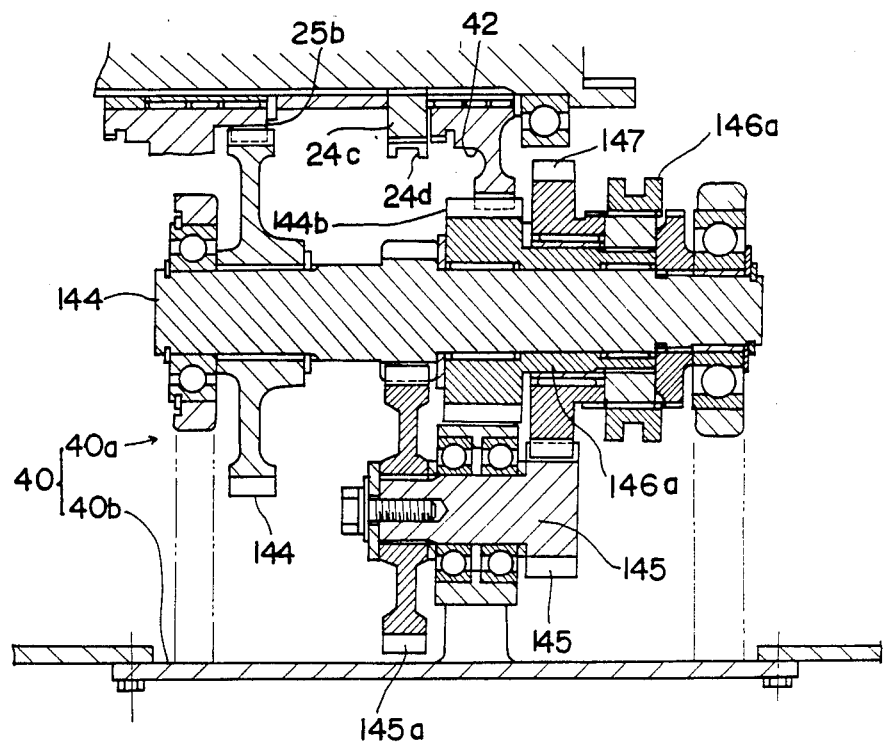
FIG. 8 is a section taken on line VIII—VIII of FIG. 7.

FIGS. 7 and 8 show a third example of supplementary change speed means 40 which provides the same number of speeds as the second example of supplementary change speed means but has a different construction.

The supplementary change speed mechanism 40a of the third example comprises a first and a second transmission shafts 144 and 145 supported by a supplementary change speed case 40b. Details of this supplementary change speed mechanism 40a are as follows: The first transmission shaft 144 carries a first gear 144a splined thereto and engageable with the further gear 25b, and a second gear 146 freely rotatably mounted thereon and engageable with the input gear 42 of the auxiliary change speed mechanism 23. The first transmission shaft 144 further carries a third gear 144b integral therewith between the first gear 144a and second gear 146. A sixth gear 146 is freely rotatably mounted on an integral boss portion 146a of the second gear 146 opposite the third gear 144b across the second gear 146. The second transmission shaft 145 carries a fourth gear 145a and a fifth gear 145b rotatable in unison therewith, the fourth gear 145a being in mesh with the fourth gear 145a and the fifth gear 145b being in mesh with the sixth gear 147.

The integral boss portion 146a includes a base at an outer end thereof carrying a shift member 146b. The shift member 146b is shiftable between a position to engage teeth defined on the sixth gear 147, a position to engage the first transmission shaft 144 through an engaging gear, and a neutral position out of engagement with the sixth gear 147 and the first transmission shaft 144.

Further, as seen from FIGS. 7 and 8, the supplementary change speed case 40b supports the supplementary change speed mechanism 40b permitting the latter to project inwardly of the intermediate case 5b, and defines a flat outer surface. This construction prevents the supplementary change speed means from being obstructive in a surrounding space of the transmission. This is achieved by employing the construction as shown in FIG. 7 in which the first transmission shaft 144 and the second transmission shaft 145 are arranged vertically and diagonally with respect to the transmission so that only a small horizontal distance is required.

The power transmitted to the second transmission shaft 24 of the auxiliary change speed mechanism in the varied speeds as described is transmitted to the rear differential mechanism 29 by way of a third transmission shaft 28 directly coupled through splines to the second transmission shaft 24. The power is also transmitted from the third transmission shaft 28 to a front differential mechanism (not shown) through gears 28a and 26a, the front wheel output shaft 26, a gear 26b, a front wheel drive hydraulic clutch 30 and a front wheel drive shaft 31.

A power transmission line fromt the first PTO shaft 7 to a working implement will be described next. As shown in FIG. 3c, the output of the first PTO shaft 7 extending to the vicinity of the third transmission shaft 28 is transmitted to a second PTO shaft 7 through a PTO drive hydraulic clutch 32. A first driven gear 33a is splined to the second PTO shaft 33 to receive the power from the PTO drive hydraulic clutch 32. This first driven gear 33a is replaceable with a second driven gear 33b. The second driven gear 33b is adapted to provide two speeds by shifting between a position to receive the output of the first PTO shaft 7 directly from the PTO drive hydraulic clutch 7 as engaged thereby transmitting the power of the engine 3 intact, and a position to engage the gear 28a on the third transmission shaft 28 to transmit the power from the third transmission shaft 28 to the second PTO shaft 33. When the power is received from the third transmission shaft 28, the working implement receives the power synchronized with a rotational rate of the front and rear wheels 1 and 2 regardless of a rotational rate of the engine 3.

A supplementary PTO change speed means may be attached to a rear end of the rear case 5c. This supplementary PTO change speed means comprises a supplementary change speed case referenced 35 here and a supplementary change speed mechanism referenced 34. The supplementary change speed mechanism 34 includes an input shaft 36 and an output shaft 37 supported by bearings mounted in the supplementary change speed case 35. The input shaft 36 is removably connected by splines to the second PTO shaft 33 extending to the vicinity of a rear opening of the rear case 5c. The ouptut of the second PTO shaft 33 is transmitted to the working implement through the input shaft 36, gears 36a and 37a and the output shaft 37.

Figure 9:
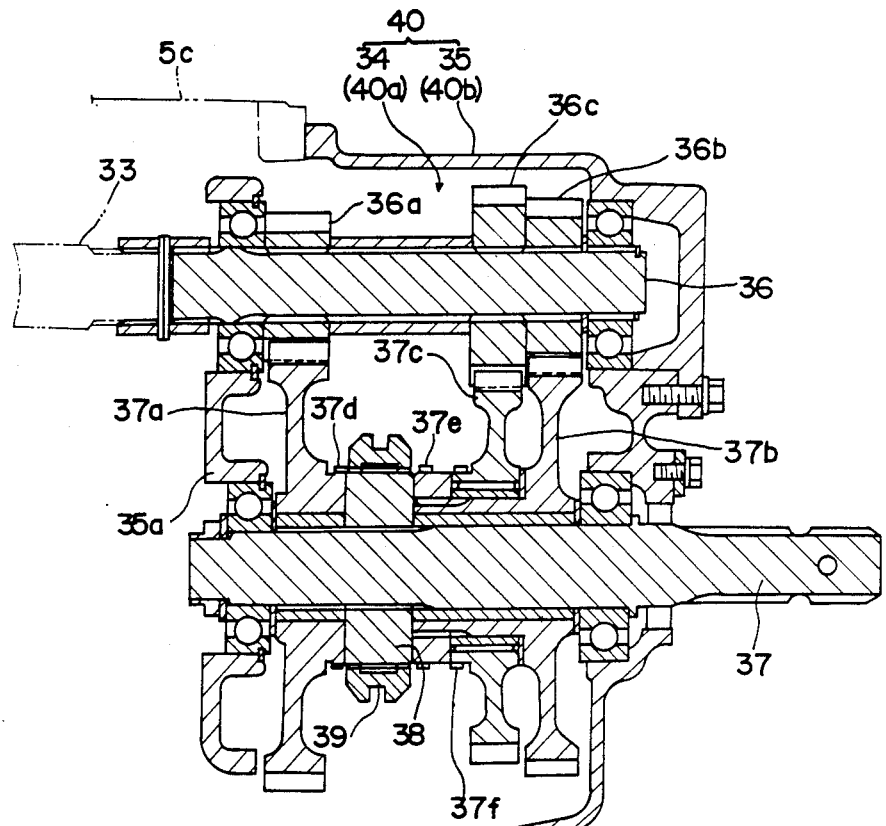
FIG. 9 is a side view of a second supplementary change speed means for a PTO shaft as attached to an opening of a rear case.

The supplementary change speed means shown in FIG. 3c may be replaced by a supplementary change speed means as shown in FIG. 9 comprising a supplementary change speed mechanism 34 housed in a supplementary change speed case 35. This supplementary change speed mechanism 34 is adapted to provide three speeds and includes an input shaft 36 carrying gears 36a, 36b and 36c fixed thereto and an output shaft 37 carrying gears 37a and 37b freely rotatably mounted thereon and in mesh with the gears 36a and 36b, respectively. The gear 37b includes a boss portion carrying a gear 37c freely rotatably mounted thereon and in mesh with the gear 36c on the input shaft 36.

A base 38 is fixed to the output shaft 37 between the gear 37a and gear 37c, and a shift member 39 is splined to this base 38 to be rotatable together and axially slidable relative thereto.

Figure 10:
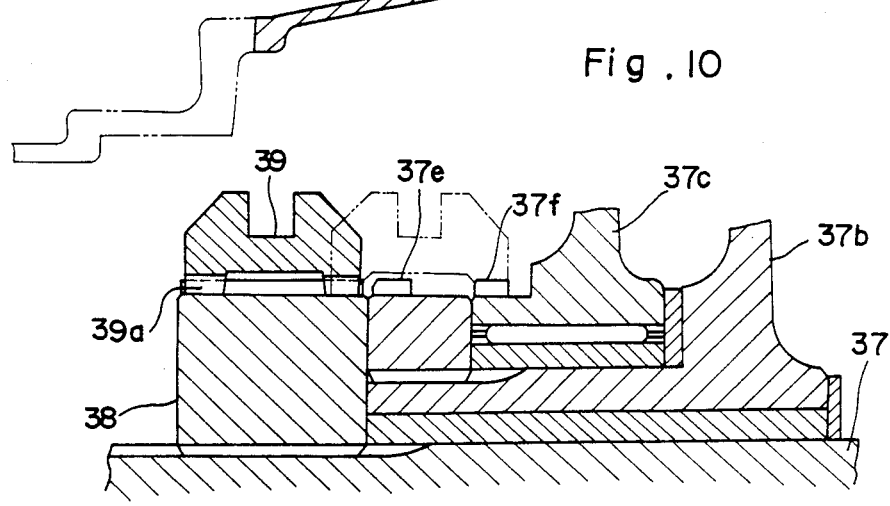
FIG. 10 is an enlarged partial view of FIG. 9 showing change speed conditions.

As shown in FIG. 10, the shift member 39 defines engaging teeth 39a only in inner peripheral walls at opposite ends thereof. Reverting to FIG. 9, when the shift member 39 is moved into engagement with an engaging portion 37d of the gear 37a, the power is transmitted from the input shaft 36 throug the gears 36a and 37a to the output shaft 37 thereby providing a low speed condition. When the shift member 39 is shifted in the opposite direction into engagement with an engaging portion 37e at an end of the boss portion of the gear 37b, the power is transmitted from the input shaft 36 through the gears 36b and 37b to the input shaft 37 thereby providing an intermediate speed condition. When the shift member 39 is shifted further rightward in FIG. 9 to a position to straddle the engaging portion 37e, the shift member 39 engages an engaging portion 37f of the gear 37c and the power is then transmitted from the input shaft 36 through the gears 36c and 37c to the output shaft 37 thereby providing a high speed condition.

Figure 11:
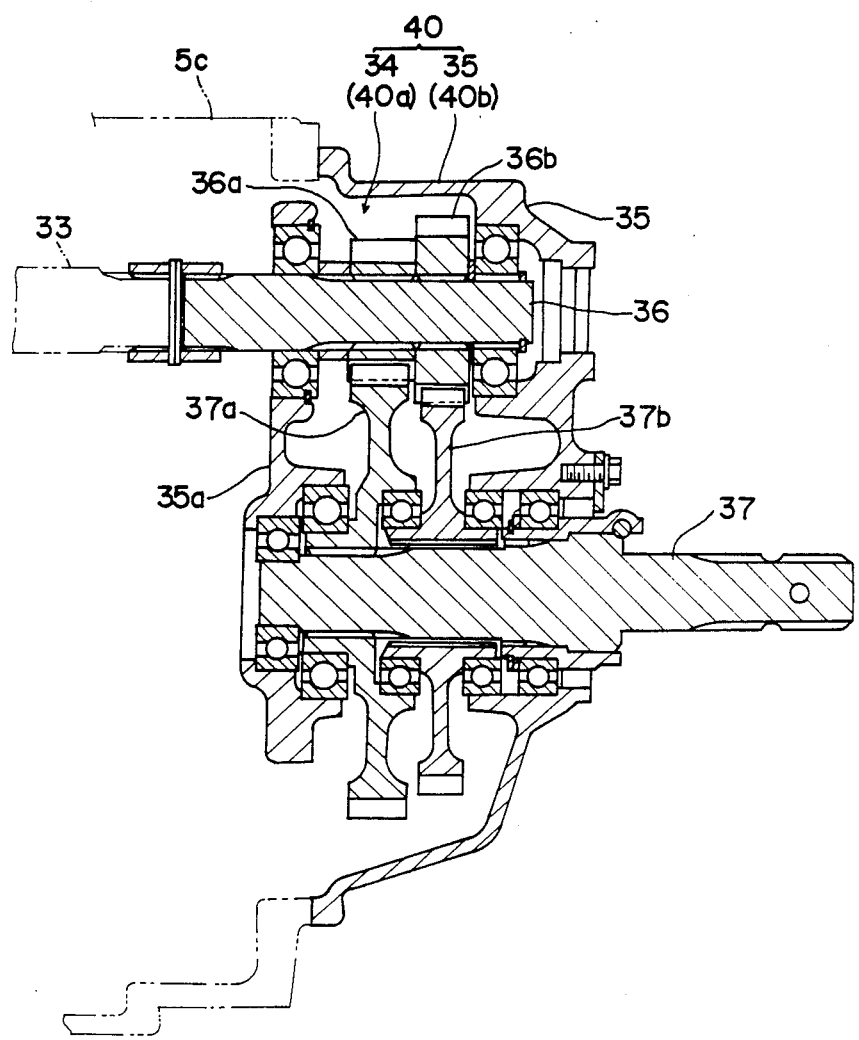
FIG. 11 is a side view of a third supplementary change speed means for the PTO shaft as attached to the opening of the rear case.

The supplementary change speed means shown in FIGS. 3c and 9 may be replaced by a supplementary change speed means as shown in FIG. 11 including a supplementary change speed mechanism 34 mounted in the supplementary change speed case 35. This construction employs two types of output shafts 37 defining splines at different positions in order to provide two, high and low, speeds. In the illustrated state an output shaft 37 defining the splines at or adjacent an end thereof is used and a gear 37a secured to the splines is placed in engagement with a gear 36 fixed to an input shaft 36 to provide the low speed. This output shaft 37 may be replaced by the other output shaft defining splines at an intermediate position instead of the end thereof. A gear 37b which is freely rotatable relative to the first-mentioned output shaft 37 is placed in mesh with the splines of the substituted output shaft 37, with the gear 37a now freely rotatable on the latter shaft. In this state the power is transmitted from the input shaft 36 through the gears 36b and 37b to the output shaft 37 to provide the high speed.

What is claimed is:

1. A transmission for an agricultural tractor comprising:
    a transmission housing including a front case, an intermediate case, and a rear case;
    main change speed means housed in said front transmission case and having a first transmission shaft means;
    rear differential means housed in said rear transmission case;

auxiliary change speed means housed in said intermediate transmission case so as to be mounted between said main change speed means and said rear differential means, said auxiliary change speed means including
  second transmission shaft means disposed coaxially with said first transmission shaft means of said main change speed means,
  first gear means fixedly coupled to said first transmission shaft means,
  second gear means rotatably mounted on said second transmission shaft means and having an auxiliary gear means intigrially coupled thereto,
  third gear means and fourth gear means rotatably mounted within said intermediate transmission case so as to rotate in unison, said third gear means being meshed with said first gear means and said fourth gear means being meshed with said second gear means,
  means for selectively coupling said first gear means and said second gear means,
  input gear means rotatably mounted on said second transmission shaft means, and
  claw clutch means for connecting said input gear means to said second transmission shaft means; and
a cassette type supplementary change speed means including
  a supplementary change speed case removably mounted in an opening defined in said intermediate transmission case,
  first and second supplementary change speed transmission shaft means supported by said supplementary change speed case,
  first supplementary change speed gear means mounted on said first supplementary change speed transmission shaft means and meshed with said auxiliary gear of said auxiliary change speed means,
  second supplementary change speed gear means mounted on said first supplementary change speed transmission shaft means for transmitting power to said auxiliary change speed means,
  third supplementary change speed gear means mounted on said first supplementary change speed transmission shaft means to be rotatable with said first supplementary change speed gear means,
  fourth supplementary change speed gear means mounted on said second supplementary change speed transmission shaft means and meshed with said third supplementary change speed gear means,
  fifth supplementary change speed gear means mounted on said second supplementary change speed transmission shaft means so as to be rotatable with said fourth supplementary change speed gear means,
  sixth supplementary change speed gear means rotatably mounted on said first supplementary change speed transmission shaft means and meshed with said fifth supplementary change speed gear means, and
  supplementary change speed switching means for selectively connecting said second and third supplementary change speed gear means and said second and sixth supplementary change speed gear means.

2. A transmission as claimed in claim 1, wherein said second supplementary change speed gear means includes a boss on which said sixth supplementary change speed gear means is rotatably mounted, said supplementary change speed switching means being provided on said boss.

3. A transmission as claimed in claim 2, wherein said supplementary change speed case is disposed in a lateral portion of said intermediate transmission case.

4. A transmission as claimed in claim 3, wherein said claw clutch means and said supplementary change speed switching means are operatively coupled to control members which are disposed adjacent each other.

* * * * *